July 6, 1965 A. E. BROUGHTON 3,193,100
LIQUID FILTER SYSTEM
Filed Aug. 24, 1960 2 Sheets-Sheet 1
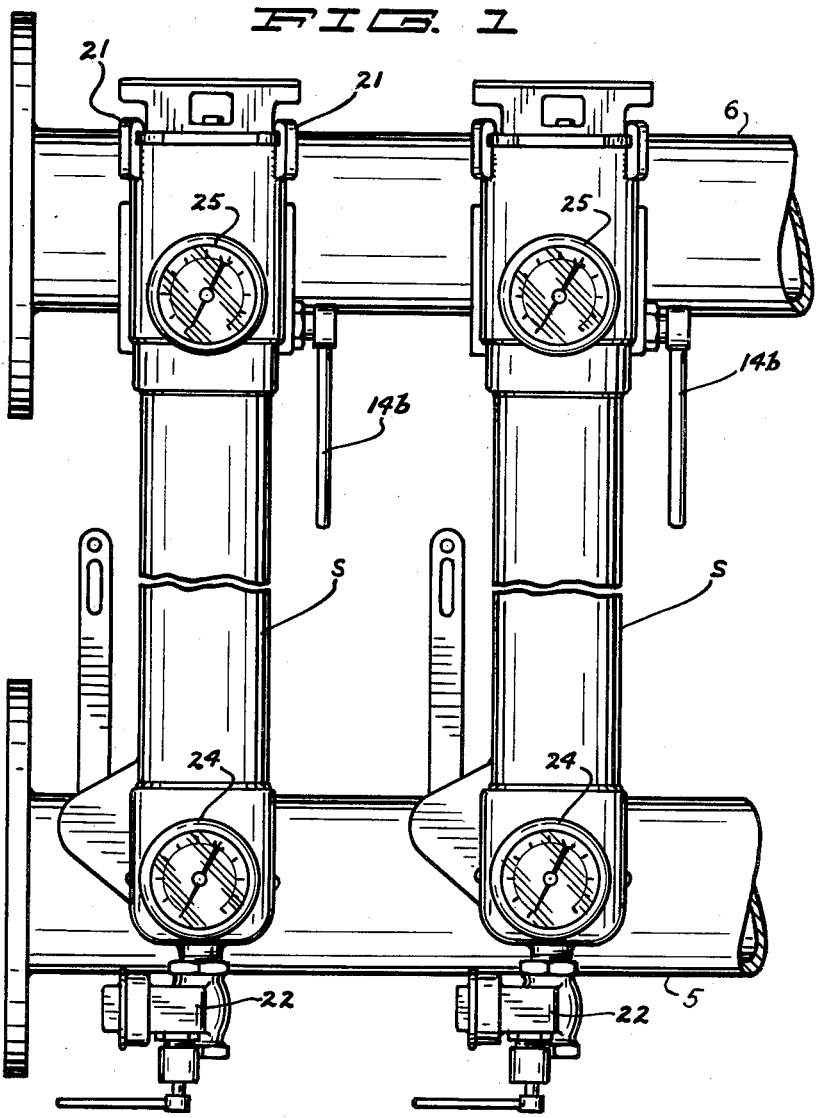
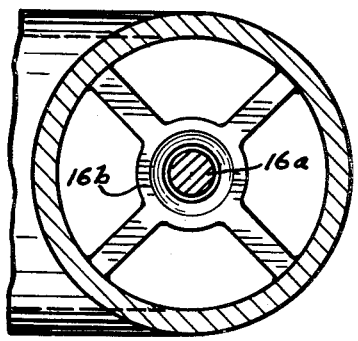
INVENTOR.
ARTHUR E. BROUGHTON
BY John W. Adams
ATTORNEY July 6, 1965   A. E. BROUGHTON   3,193,100
LIQUID FILTER SYSTEM
Filed Aug. 24, 1960   2 Sheets-Sheet 2

INVENTOR.
ARTHUR E. BROUGHTON
BY John W. Adams
ATTORNEY

3,193,100
LIQUID FILTER SYSTEM
Arthur E. Broughton, Glens Falls, N.Y., assignor to A. E. Broughton & Co., Inc., a corporation of New York
Filed Aug. 24, 1960, Ser. No. 51,662
1 Claim. (Cl. 210—117)

This invention relates to a liquid filter system and particularly to a multiple filter assembly for removing solids from liquids.

Numerous filter systems have been used in the past for removing suspended solids from flowing liquids, however, all of these systems required the complete shutdown of the filtering system when the same is to be cleaned and do not permit cleaning of one unit at a time. Neither do they permit back washing of the filtering element with clean filtered water without removing the filtering element from the individual filter unit being cleaned.

It is an object of my present invention to provide a multiple unit liquid filtering system particularly designed to remove solids suspended in the liquid and to facilitate cleaning of the individual filtering units without shutting down the entire filtering system.

More specifically it is an object to provide a multiple unit filter system for removing solids from a flowing liquid supply without unnecessarily impeding the flow of liquid therethrough and permitting quick and easy cleaning of the individual filter units without shutting down the filtering system and using a clean water back wash system specifically arranged to prevent substantial pressure drop during the cleaning operation.

Still more specifically it is an object to provide a valve conduit arrangement particularly adapted to accomplish the foregoing objects.

These and other objects and advantages of this invention will more fully appear from the following description made in connection with the accompanying drawings wherein like reference characters refer to the same or similar parts throughout the several views, and in which:

FIG. 1 is a fragmentary front elevational view of a liquid filter assembly embodying the invention;

FIG. 3 is a fragmentary horizontal sectional view taken substantially along the line 3—3 of FIG. 2.

Figure 4:
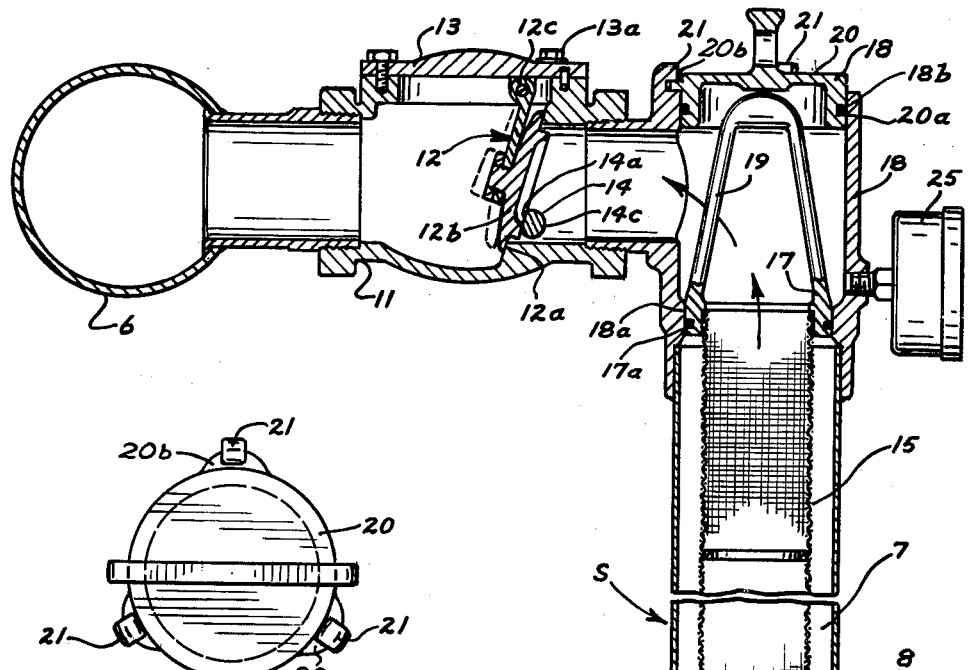
FIG. 4 is a top plan view of one of the filter units showing the cover locking mechanism of the filter chamber.

As best shown in FIG. 1, I provide liquid supply means such as the supply conduit or manifold 5. A plurality of filter units S are connected in parallel between the unfiltered liquid supply inlet manifold or conduit 5 and the filtered liquid outlet conduit 6. A filter chamber 7 is defined in the form of the invention illustrated by an imperforate cylindrical tube or casing 8. The lower end of the tube 8 is, in the form shown, connected to the inlet conduit 5 through an inlet coupling conduit 9 in which a control valve 10 is mounted. The valve 10 is, in the form shown, a conventional manually operated gate-type valve which is connected in a manner to control communication between the inlet conduit 5 and the filter chamber 7.

The upper end of the chamber 7 communicates with the outlet conduit 6 through an outlet coupling conduit 11. A check valve 12 is mounted in the coupling conduit 11 to normally prevent back flow of filtered liquid therethrough. In the form shown, this valve includes annular valve seat 12a and valve member 12b which is swingably mounted on a pivot pin 12c which in turn is carried by a removable mounting plate 13 removably connected to the outlet coupling conduit 11 as by cap screws 13a. A check valve opening mechanism is provided which incorporates the use of a camming shaft 14 journaled through the coupling conduit 11. The shaft 14 has a flat recessed side 14a which normally permits the check valve 12b to be sealingly seated against its seat 12a when the pressure on the outlet side exceeds that on the inlet side. However, when the shaft 14 is rotated by control handle 14b, best shown in FIG. 1, the flat surface 14a is rotated out of registration with the valve element 12b and said valve element is cammed away from its seat by the curved camming surface 14c of the shaft 14 to positively hold said valve element in partially open position to permit limited back flow of clear filtered liquid into chamber 7 to back wash the filter element.

In the form shown, filter means such as the cylindrical filter element 15, are mounted in the filter chamber 7. The filter element 15 has an imperforate bottom 16 with a centering pin 16a depending therefrom. The bottom is mounted on a supporting spider 16b having a mating opening in the central annular portion thereof to receive the pin 16a and maintain the lower portion of the filter 15 in centered relation with the chamber 7. The upper end of the filter has an annular support member 17 having suitable sealing means such as the O-ring 17a mounted around the outer periphery thereof and sealably inserted into a cylindrical mating portion 18a of a supporting casting 18 which also forms an elbow connection with the conduit 11.

A handle 19 is connected to the top annular filter support 17 and permits the filter to be removed through an opening 18b provided in the top of the casting 18 which opening is axially aligned with the cylindrical chamber 7 and filter 15 mounted therewithin. This opening 18b is slightly larger than the outer peripheral dimensions of the filter 15 and the end supporting members 16 and 17. A removable closure plug 20 is mounted in the opening 18b and has suitable sealing means such as the O-ring 20a. In the form shown, the cover 20 is held in place by a bayonet-type locking mechanism which incorporates a plurality of overlying hold-down members such as the three inverted L-shaped dogs 21, fixed to the casting 18. The cover 20 has a plurality of co-operating camming segments 20b spaced therearound to respectively underlie the dogs 21 and positively hold the cover in closed position when the cover is rotated so that the segments 20 are in registration with the dogs 21. When the segments 20b are rotated out of engagement with the dogs 21, the cover 20 may be lifted out of the opening 18b to permit removal of the filter 15 through said opening. Suitable sealing means such as the O-ring 20a are provided around the periphery of the cover plug 20.

A drain valve 22 is connected to the bottom of the chamber 7 to permit liquid to flow out of said chamber when the valve 10 is closed. A pair of pressure indicating gauges 24 and 25 are respectively mounted at the bottom and top of the chamber 7 to measure the pressure drop through the chamber due to resistance of flow through the filter 15 and thus permit quick determination of the condition of the filter and permit the same to be cleaned whenever the pressure drop has become excessive which, of course, indicates a clogged filter condition.

Figure 2:
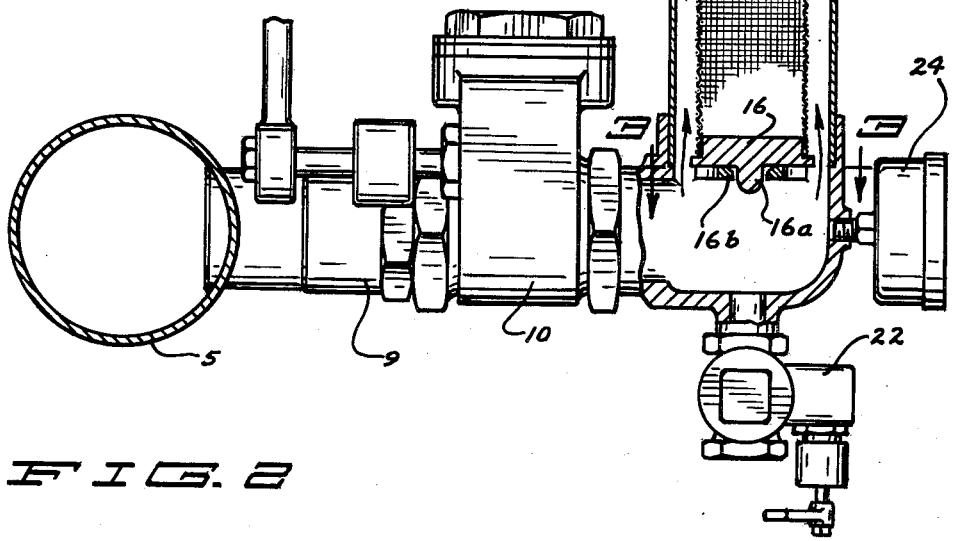
FIG. 2 is a vertical sectional view of one of the filter units.

In order to clean the filter without removing the same, the valve 10 is initially closed. The drain valve 22 is opened and the check valve 12 is cammed into open position as shown by the dotted lines of FIG. 2 by rotating the shaft 14 to engage the cylindrical camming surface 14c with the inside of the check valve 12b This back washes the clean water from the outlet conduit 6 through the filter and removes most of the accumulation on the outside thereof which is carried to a suitable drain through the open valve 22.

In FIG. 1 a pair of filter units S are shown, however, it is contemplated that a battery of such units is to be incorporated in such a system depending upon the desired capacity thereof. The system would, of course, be designed so that adequate capacity would be provided even if one of the units was shut off for cleaning.

It will be seen that I have provided a relatively simple yet highly efficient liquid filtering system which will permit quick and easy cleaning of each individual filter element without shutting down or materially reducing the flow of water therethrough.

It will, of course, be understood that various changes may be made in the form, details, arrangements and proportion of parts without departing from the scope of my invention, which generally stated consists in the matter set forth in the appended claim.

What I claim is:

A liquid filtering system comprising a plurality of filtering chambers, each having a normal intake portion and a normal discharge portion, filtering means in each chamber, liquid supply conduit communicating with said chambers, a filtered liquid discharge conduit communicating with said chambers, valve means to selectively close off direct communication between the liquid supply conduit and each of said chambers, individual valve means to drain the liquid from the normal intake portion of each of said chambers, a check valve interposed between the normal discharge portion of the filtering chamber and the discharge conduit to normally prevent back flow of filtered liquid from said discharge conduit through said chamber, means for producing limited opening of said check valve to provide back flow of filtered liquid from said discharge conduit when said drain valve is opened to wash out solid accumulations on said filtering means, said check valve opening means comprising a cam shaft journaled in close association to the check valve and provided with a camming portion for engaging the check valve to open the same a predetermined limited amount when said shaft is rotated, and means for rotating said shaft to provide said limited opening of said check valve.

References Cited by the Examiner

UNITED STATES PATENTS

| | | | |
|---|---|---|---|
| 802,714 | 10/05 | Smith | 210—90 X |
| 830,046 | 9/06 | Bole | 137—522 X |
| 1,627,186 | 5/27 | Lalor | 210—340 |
| 1,943,811 | 1/34 | Child et al. | 210—340 |
| 2,017,350 | 10/35 | Morgan | 210—332 X |
| 2,068,468 | 1/37 | Phillips | 210—333 |
| 2,525,000 | 10/50 | Seligman et al. | 210—340 |
| 2,907,491 | 10/59 | Gunn | 220—40 |
| 3,015,279 | 1/62 | Nechine. | |

REUBEN FRIEDMAN, *Primary Examiner*.

HERBERT L. MARTIN, *Examiner*.